United States Patent
Hosomi et al.

(10) Patent No.: US 8,570,686 B2
(45) Date of Patent: Oct. 29, 2013

(54) MAGNETIC RECORDING HEAD WITH NON-CONFORMAL SIDE SHIELD GAP

(75) Inventors: Kazuhiko Hosomi, Fujisawa (JP); Kimitoshi Eto, Odawara (JP); Mikito Sugiyama, Odawara (JP); Junichi Hashimoto, Kanagawa (JP); Kazue Kudo, Odawara (JP); Misuzu Kanai, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/419,283

(22) Filed: Mar. 13, 2012

(65) Prior Publication Data
US 2013/0242431 A1  Sep. 19, 2013

(51) Int. Cl.
*G11B 5/33* (2006.01)
(52) U.S. Cl.
USPC ..................................... 360/125.3
(58) Field of Classification Search
USPC ............... 360/125.3, 125.03, 125.09, 125.04, 360/125.17, 125.12, 125.16, 125.06, 360/125.15, 125.26
See application file for complete search history.

(56) References Cited

U.S. PATENT DOCUMENTS

| | | | |
|---|---|---|---|
| 6,954,340 B2 | 10/2005 | Shukh et al. | |
| 7,639,450 B2 | 12/2009 | Hsu et al. | |
| 7,649,712 B2 * | 1/2010 | Le et al. | 360/125.3 |
| 7,866,029 B2 | 1/2011 | Gomi et al. | |
| 7,885,036 B2 | 2/2011 | Matono et al. | |
| 2006/0044682 A1 * | 3/2006 | Le et al. | 360/126 |
| 2007/0035885 A1 | 2/2007 | Im et al. | |
| 2008/0088972 A1 | 4/2008 | Sasaki et al. | |
| 2008/0112081 A1 | 5/2008 | Matono | |
| 2009/0168241 A1 | 7/2009 | Mochizuki et al. | |
| 2010/0301007 A1 | 12/2010 | Ishizaki et al. | |
| 2010/0302680 A1 | 12/2010 | Hirata et al. | |
| 2010/0321825 A1 | 12/2010 | Nazarov | |

FOREIGN PATENT DOCUMENTS

| | | |
|---|---|---|
| JP | 2009/043344 | 2/2009 |
| JP | 2009/151861 | 7/2009 |
| KR | 2009/0050745 A | 5/2009 |
| KR | 2009/050746 A | 5/2009 |
| WO | 2009/101689 A1 | 8/2009 |

\* cited by examiner

*Primary Examiner* — Allen T Cao
(74) *Attorney, Agent, or Firm* — Zilka-Kotab, PC

(57) ABSTRACT

A magnetic write head having a shield structure that provides both a leading shield and side shielding function. The magnetic shield is separated from the sides and leading edge of the write pole by a non-magnetic gap layer that has a non-uniform thickness. The non-magnetic gap layer is thicker near the leading edge and thinner at the trailing edge. This allows for increased side field gradient near the trailing edge of the write pole and decreased write field loss at the leading edge of the write pole.

19 Claims, 35 Drawing Sheets

MAGNETIC RECORDING HEAD WITH NON-CONFORMAL SIDE SHIELD GAP

FIELD OF THE INVENTION

The present invention relates to magnetic data recording and more particularly to a magnetic write head having a non-conformal side gap for improved write head performance and reduced adjacent track interference and far track interference.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data.

Writing magnetic data involves a balance of several factors. In order to effectively write to the media the strength of the write field should be maximized. Also, however, the efficiency of magnetic switching can be improved by increasing the write field gradient. In addition, adjacent track interference (ATI) and far track interference (FTI) should be avoided. An increase in write field gradient can be achieved by providing magnetic shielding adjacent to the write pole. The shield can be separated from the write pole by a non-magnetic gap. The smaller this gap is, the greater the increase in field gradient will be. However, with a decrease in gap thickness comes a corresponding decrease in write field due to the loss of magnetic write field to the shield. In addition, the shield can contain magnetic flux concentration points that can contribute to adjacent track interference (ATI) or far track interference (FTI).

SUMMARY OF THE INVENTION

The present invention provides a magnetic write head having a magnetic write pole with a triangular cross section at the ABS, and a non-magnetic layer surrounding the leading edge and the sides of the write pole. A magnetic write pole surrounds the non-magnetic layer. The non-magnetic layer can be formed with a non-uniform thickness so that the side gap thickness at the trailing edge of the write pole is different than (less than) the thickness of the gap at side gap and leading gap at the leading edge of the write pole.

The side shields can be magnetically bonded with the leading magnetic shield, and the structure can be constructed so as to have an absence of asymmetrical structures (projections) in the shield. The structure also allows the relationship between leading shield thickness and side shield thickness to be controlled as desired for optimal performance.

More specifically, the relationship of the leading gap thickness to side gap thickness can be achieved by establishing a relationship in which the shield bevel angle and write pole bevel angle differ and in which the write pole bevel angle is greater than the shield bevel angle. The gap shield interface can be formed as an inverted trapezoid shape and the gap layer uniformly traces the inner side of the inverted trapezoid shape to form a triangular shape on the inner side of the gap. The various shape parameters preferably satisfy the following relationship:

$$W < 2d(\tan\beta_{ABS}) - 2T((1/\cos\beta_{ABS}) - \tan\beta_{ABS})$$

Where W is the shield opening width, d is the Depth of the groove formed in the shield, $\beta_{ABS}$ is the shield bevel angle and t is the side gap thickness.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
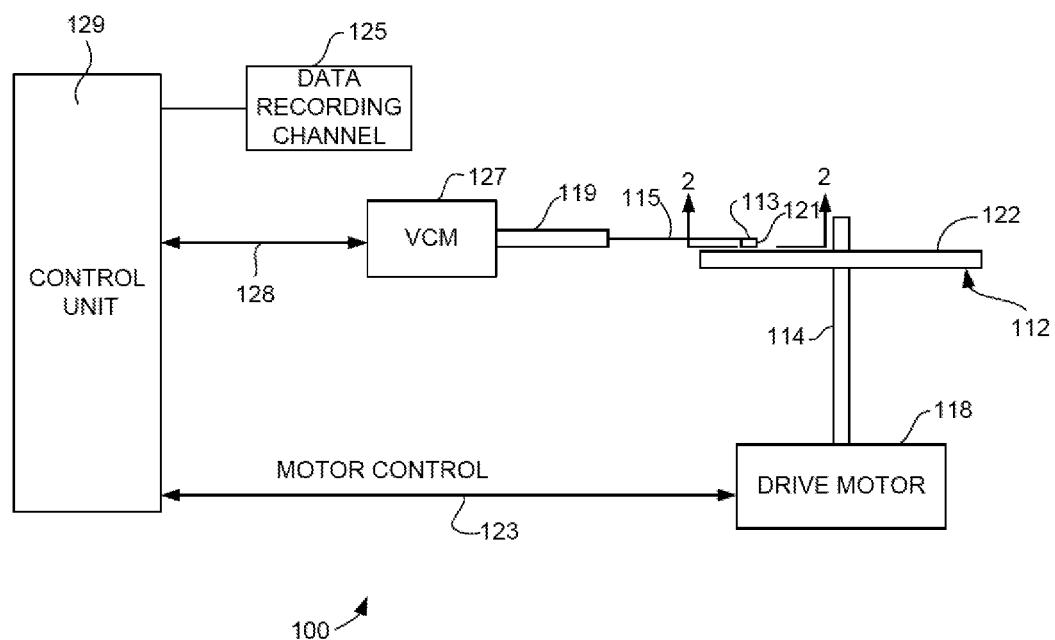
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
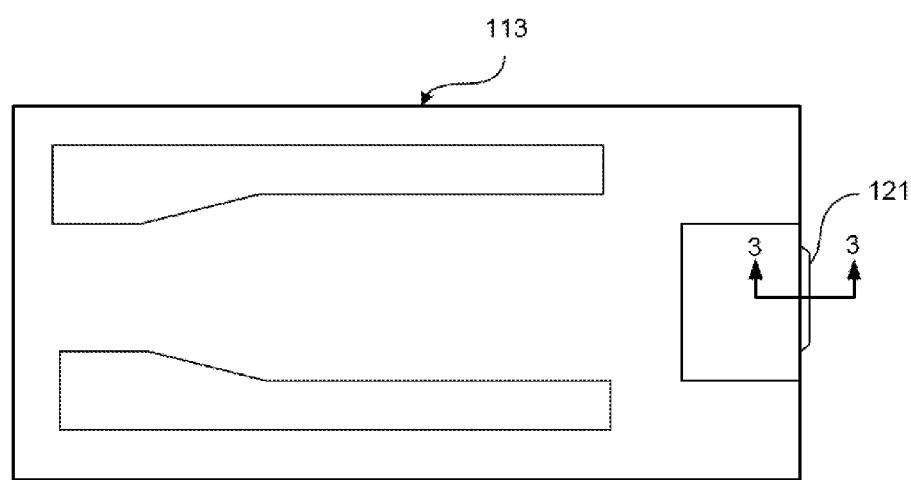
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
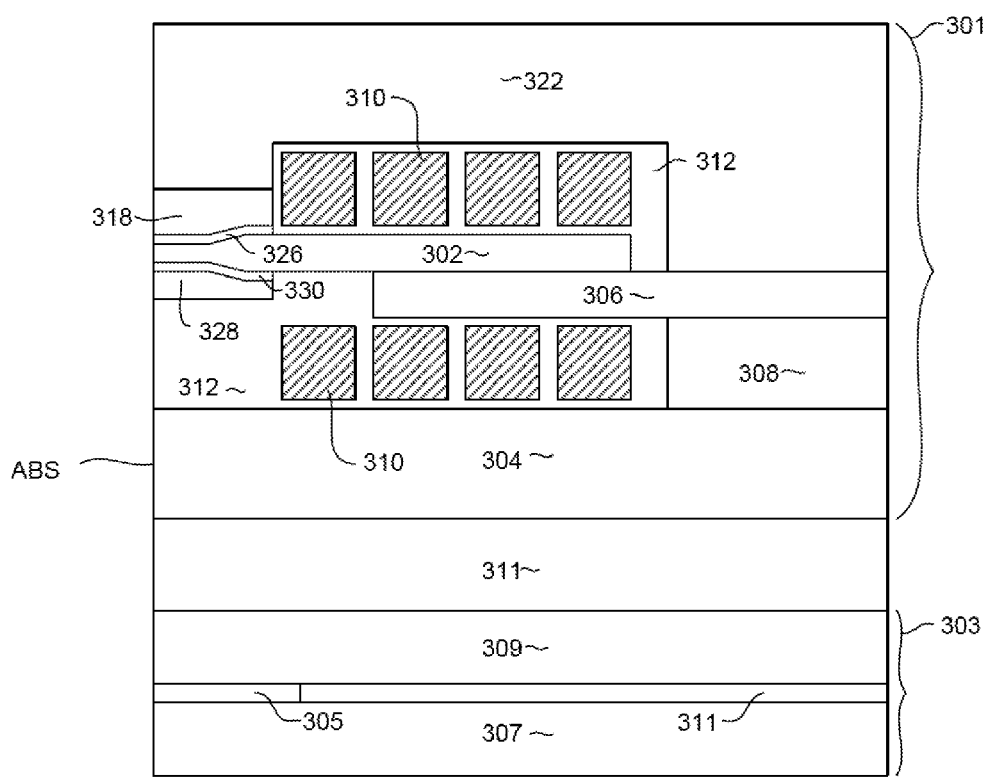
FIG. 3 is a side view of a magnetic head, taken from line 3-3 of FIG. 2 and rotated 90 degrees counterclockwise, of a magnetic head according to an embodiment of the present invention.

FIG. 3 is a side cross sectional view of a magnetic head 300 that can be constructed by a method of the present invention. The magnetic head 300 can include a magnetic write head 301 and a magnetic read head 303. The read head 303 includes a magnetoresistive sensor 305 (such as a giant magnetoresistive sensor (GMR) or tunnel junction magnetic sensor (TMR) that is sandwiched between first and second magnetic leads 307, 309. The space between the shields 307, 309 can be filled with a non-magnetic, dielectric fill layer 311 such as alumina.

The write head 301 includes a magnetic write pole 302 and a magnetic return pole 304. The magnetic write pole 302 can be connected with a magnetic shaping layer 306 that helps to conduct magnetic flux to the tip of the write pole 302. The write pole 302 and shaping layer 306 can be connected with the magnetic return pole 304 by a magnetic back gap structure 308. A non-magnetic, electrically conductive write coil 310 passes between the return pole 304 and the write pole and shaping layer 302, 306, and may also pass above the write pole and shaping layer 302, 306. The write coil 310 can be encased in a non-magnetic, electrically insulating material 312, which can be a material such as alumina and/or hard baked photoresist. When an electrical current flows through the write coil 310, a magnetic field is induced around the coil 310 that results in a magnetic flux flowing through the return pole 304, back gap layer 308, shaping layer 306 and write pole 302. This results in a write field being emitted from the tip of the write pole 302. This strong, highly concentrated write field locally magnetizes a magnetic top layer 314 of the magnetic media 112 (FIG. 1).

The write head 300 also includes a trailing magnetic shield 318, located at the air bearing surface (ABS) and separated from the write pole 302 by a non-magnetic trailing gap layer 326. The trailing magnetic shield 318 can be connected with the other magnetic structures at the back of the write head 300 by a trailing magnetic pole 322. The write head 300 also includes a leading magnetic shield 328 that is separated from the write pole 302 by a non-magnetic leading gap layer 330. Each of the magnetic structures 302, 304, 306, 308, 318, 322 can be constructed of a magnetic material such as CoFeN, CoNiFe, NiFe or CoFe.

Figure 4:
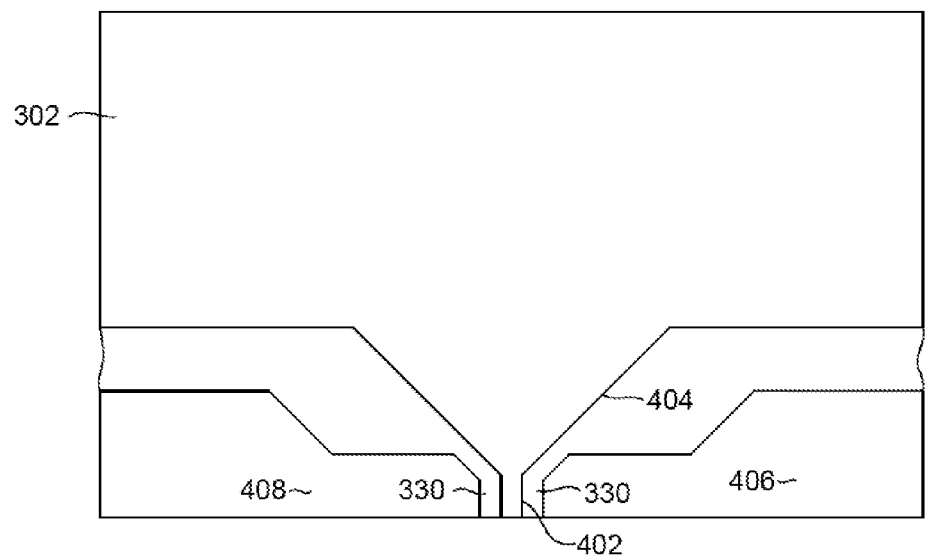
FIG. 4 is top down view of a write pole of the magnetic head of FIG. 3.

FIG. 4 shows a top down view of the write pole 302. As can be seen in FIG. 4, the write pole 302 has a narrow pole tip portion 402 near the air bearing surface (ABS) and has a flared portion 404 away from the ABS. Also, the leading shield 328 (FIG. 3) wraps around the sides bottom of the write pole to form side shield portions 406, 408. The side shield portions are separated from the sides of the write pole 302 by non-magnetic side gap layers 330, that are integral with the leading gap 330 (FIG. 3) and which will be described in greater detail herein below.

Figure 5:
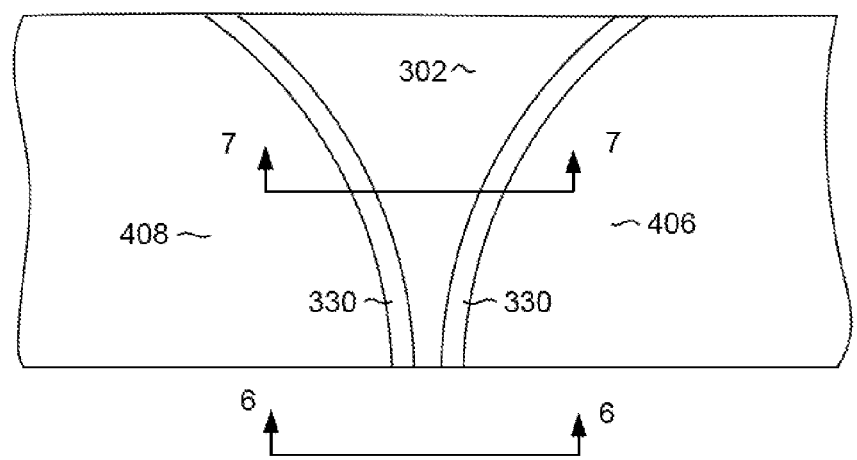
FIG. 5 is an enlarged top down view of a portion of the write pole of FIG. 4.

FIG. 5 shows an enlarged view of the pole tip portion of the write pole 302 according to an embodiment of the invention. As can be seen, pole tip portion of the write pole 302 can be formed so that it forms a curved flare. Therefore, rather than having a straight pole tip portion and an abrupt transition to a flared portion, the sides can gradually curve outward. As shown.

Figure 6:
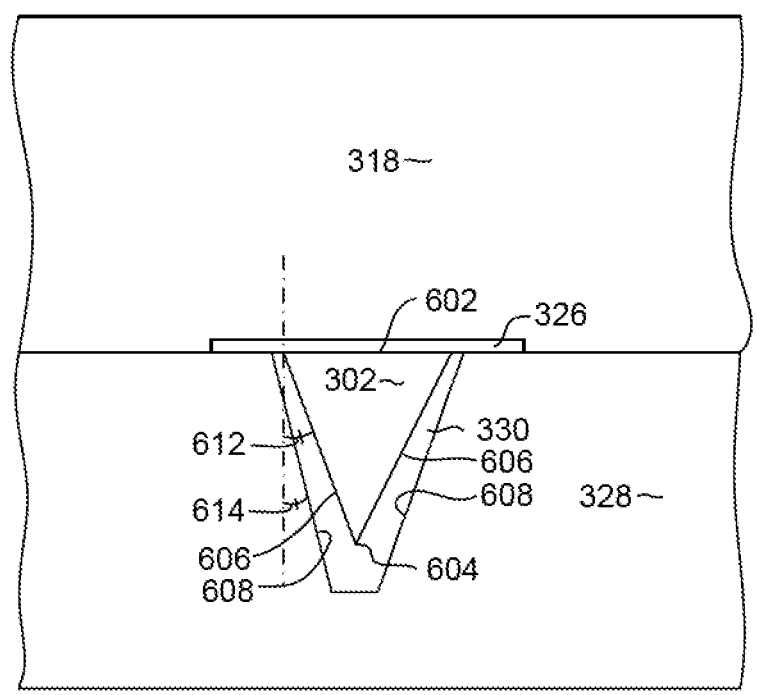
FIG. 6 is an Air Bearing Surface (ABS) view of the magnetic write head.
Figure 7:
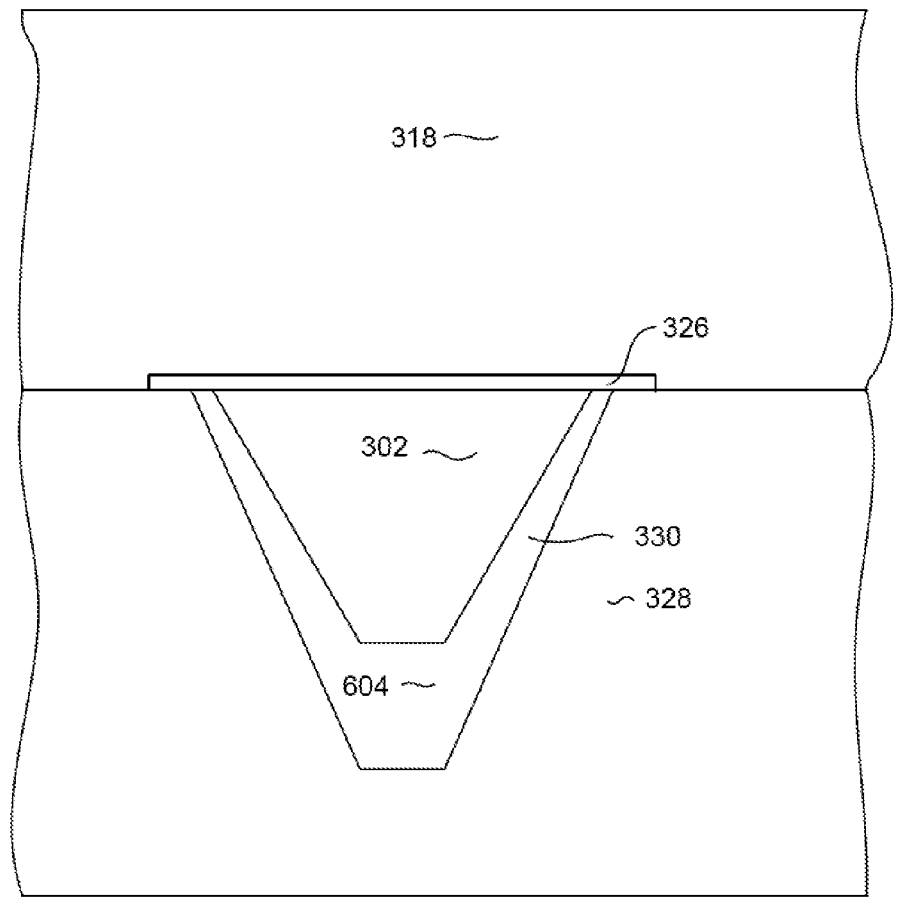
FIG. 7 is a cross sectional view of the write head, showing a plane parallel with the air bearing surface.

FIG. 6 shows an ABS view of the head 300 as seen from line 6-6 of FIG. 5, and FIG. 7 shows a cross sectional view of a plane parallel with the ABS but recessed from the ABS as seen from line 7-7 of FIG. 5. As can be seen in FIGS. 6 and 7, the write pole 320 has a triangular cross section at the ABS. With the trailing edge 602 of the write pole 302 having a width that defines a track width, and the leading edge of the write pole forming a point. The write pole 302 could also have a trapezoidal shape at the ABS, with the leading edge being narrower than the trailing edge. As can be seen, in both FIGS. 6 and 7, non-magnetic gap material 330 provides both leading and side shield functions, wrapping around the bottom (leading edge) 604 of the write pole 302. The gap layer 330 can be constructed of a material such as alumina or a non-magnetic metal such as Ru, NiCr, Ta, W, NiB or NiP. The trailing gap layer 326 separates the trailing magnetic shield 318 from the trailing edge 602 of the write pole 302. The trailing gap layer 326 can be constructed of a material such as alumina, Ru, NiCu, Ta, W, NiB or NiP. The trailing magnetic shield 318 can be a magnetic material such as NiFe.

A comparison of FIGS. 6 and 7 also reveals that the write pole has a larger cross section at the ABS than at the location that is recessed from the ABS. More specifically, the write pole 302 has a smaller down track dimension (measured from the leading edge 604 to the trailing edge 602) at the ABS than it does away from the ABS.

Prior art magnetic write heads have been constructed to have non-magnetic side gap layers with a constant, uniform thickness from the leading edge to the trailing edge. In addition, many such structures have been constructed as three-surface shield structures having a trailing shield, and first and separate first and second side shields. These structures, however, suffer from various shortcomings. For example such a structure can suffer from the effect of magnetic field leakage from the leading side on adjacent tracks as a result of skew. Also, such structures can experience the occurrence of a phenomenon known as "side-shield erase" in which charge accumulates in protrusions formed in the lowermost edge of the side shields, resulting in the generation of a magnetic field and data erasure.

A magnetic write head according to the present invention overcomes these issues. In addition to a trailing shield and side shields, the present invention provides a shield structure that functions as a leading shield as well as a side shield, the leading and side shielding being provided by a single integral structure. In this structure there are no protrusions formed in the lowermost edge of the side shields which could generate a magnetic field and cause data erasure.

While a leading shield structure has been considered, a structure for achieving this would have had a side gap having a uniform thickness and having a thickness that is the same as the leading gap. Such a structure would result in design limitations and reduced write head performance. For example, if the side gap were to be made to have a small enough thickness to provide improved magnetic field gradient in the cross track direction, the leading gap would also have to have this small thickness (where such a small thickness is not actually needed or desired) which would result in the loss of write field to the leading portion of the shield.

According to the present invention and as shown in FIGS. 6 and 7, the gap layer 330 is thinner near the trailing edge 602 than it is near the leading edge 604. This means that the sides 606 of the write pole 302 taper at a different angle than the innermost sides 608 of the shield 328. More specifically, in FIG. 6, line 610 represents the direction of the data track, or a direction that is perpendicular to the trailing edge 602 of the write pole 302. The sides 606 of the write pole 302 define a write pole bevel angle 612 relative to the line 610, and the sides 608 of the shield 328 define a side shield bevel angle 614 relative to the line 610. The write pole bevel angle 612 is larger than the side shield bevel angle 614. The thickness of gap 330 at the sides of the write pole can be, for example, 20 nm to 100 nm. The write pole bevel angle 614 and side shield bevel angle can each be 10-30 degrees and the difference between the write pole bevel angle and the side shield bevel angle can be 2 degrees to 10 degrees.

Figure 31:
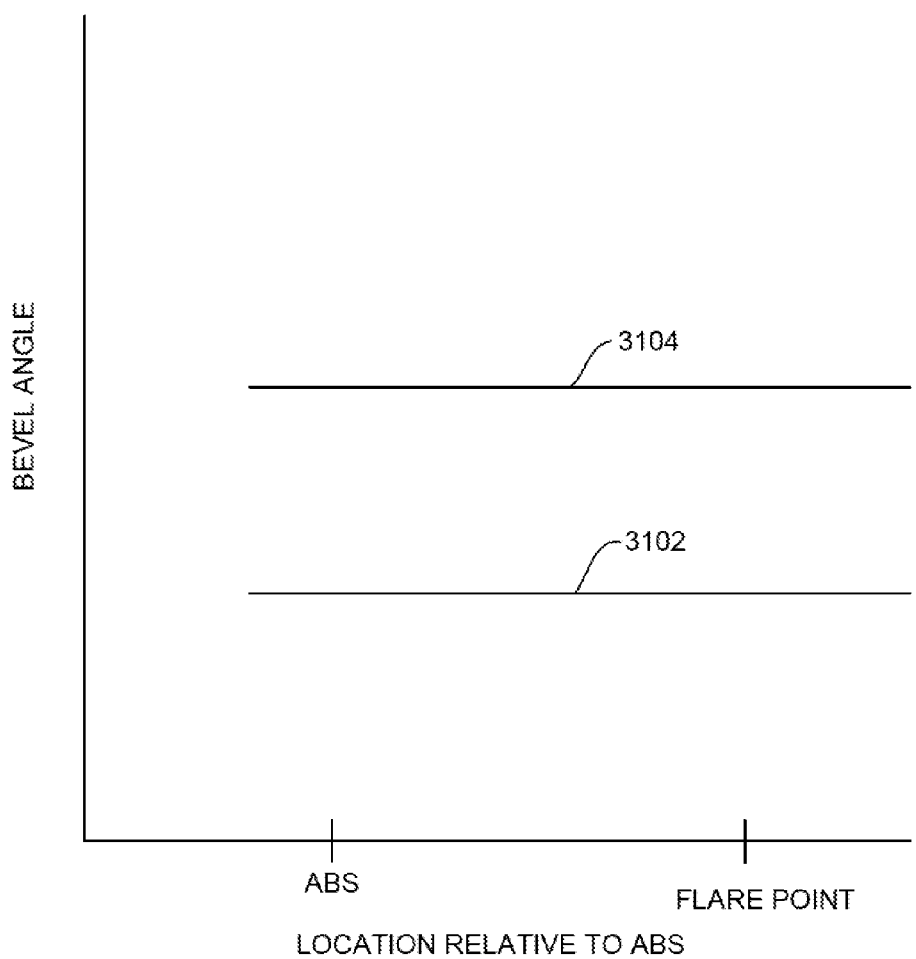
FIG. 31 is a graph showing the showing the relationship between write pole and leading shield bevel angle and location relative to the ABS for the first embodiment described with reference to FIGS. 4-7.
Figure 32:
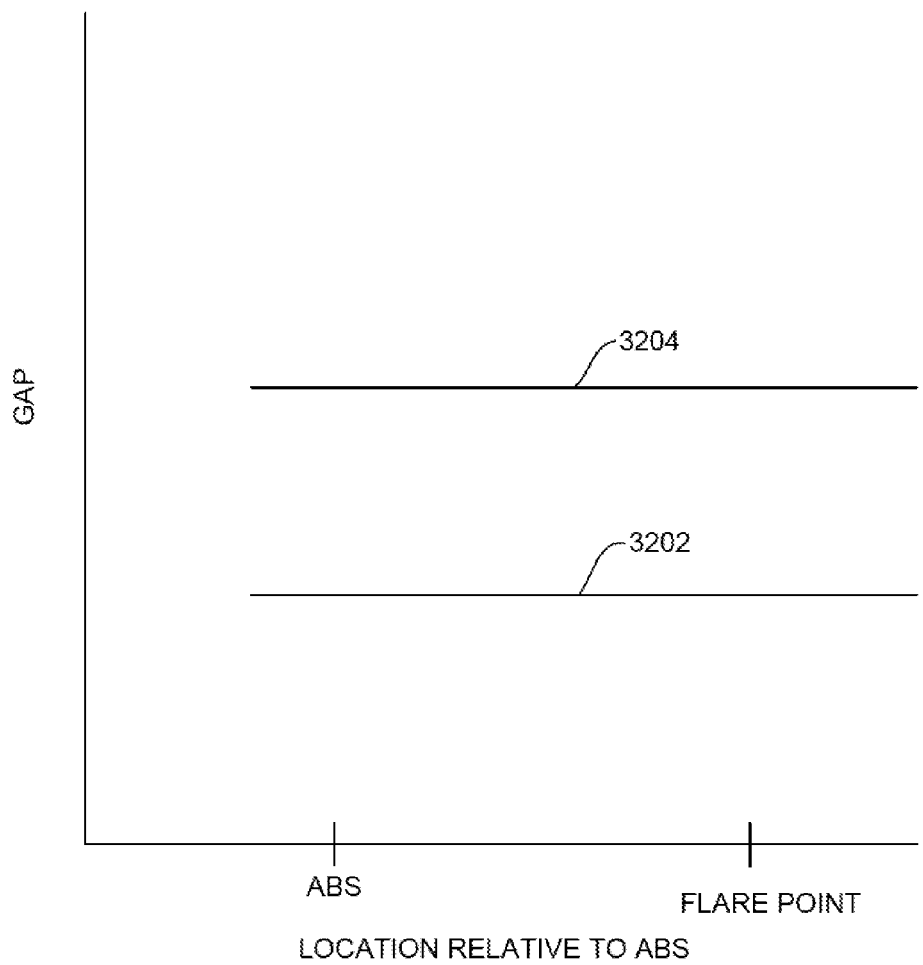
FIG. 32 is a graph showing the relationship between side and leading gap and location relative to the ABS plane for the embodiment described above with reference to FIGS. 4-7.

The structure of the write head 302 can be shown graphically in FIGS. 31, and 32. In FIG. 31, the line 3102 shows the leading shield bevel angle 614, and line 3104 shows the write pole bevel angle 612. As can be seen, although the write pole bevel angle 3104 is greater than the shield bevel angle 614, they are both constant and do not vary with varying distance from relative to the ABS. Similarly, in FIG. 32, the line 3202 shows the side gap spacing, and line 3204 shows the leading gap spacing (distance between the leading edge of the write pole 302 and the shield 328 in the leading direction) each relative to distance from the ABS. As can be seen, although the leading gap 3204 is greater than the side gap 3202, they are both constant relative to distance from the ABS.

In a structure of the present invention the side gaps 330 constrict near the trailing edge 602 of the write pole 302 and accordingly the cross track field gradient is improved. On the other hand, because the gap 330 is thicker near the leading edge 604, the magnetic field absorption by the shield 328 is suppressed and magnetic field strength is ensured. In addition, because the bevel angle formed in the shield is constant, adjacent track interference (ATI) and far track interference (FTI) can be prevented even when skew occurs. In addition, the absence of asymmetrical portions or protrusions in this structure ensures the prevention of charge accumulation and the avoidance of the side-shield erase phenomenon.

There are other advantageous effects as well. When the bevel angle of the write pole 302 is large, this has a curvature-reducing effect. On the other hand, the main role of the shield bevel angle is to prevent magnetic field leakage when skew occurs. Because the bevel angle for improving curvature is larger than the bevel angle adopted as a counter-measure for skew, the structure of the present invention in which the bevel angle of the main magnetic pole is larger than the bevel angle of the shield is advantageous from the standpoint of reducing curvature.

In addition, a structure of the present invention in which the bevel angle reduces in the direction away from the ABS can be adopted. This can be seen with reference to FIGS. 6 and 7 which show a cross section at the ABS and away from the ABS respectively. In this structure the reduction in bevel angle in the direction away from the ABS allows for an increase in the volume of the main magnetic pole, and ensures an even larger magnetic flux.

Furthermore, a structure of the present invention in which the side gap 330 constricts in proximity to the ABS and expands in the direction away from the ABS may be adopted. This structure prevents the phenomenon of magnetic flux absorption by the shield at locations separated from the ABS, and this is more advantageous from the standpoint of ensuring magnetic field strength.

Figure 8:
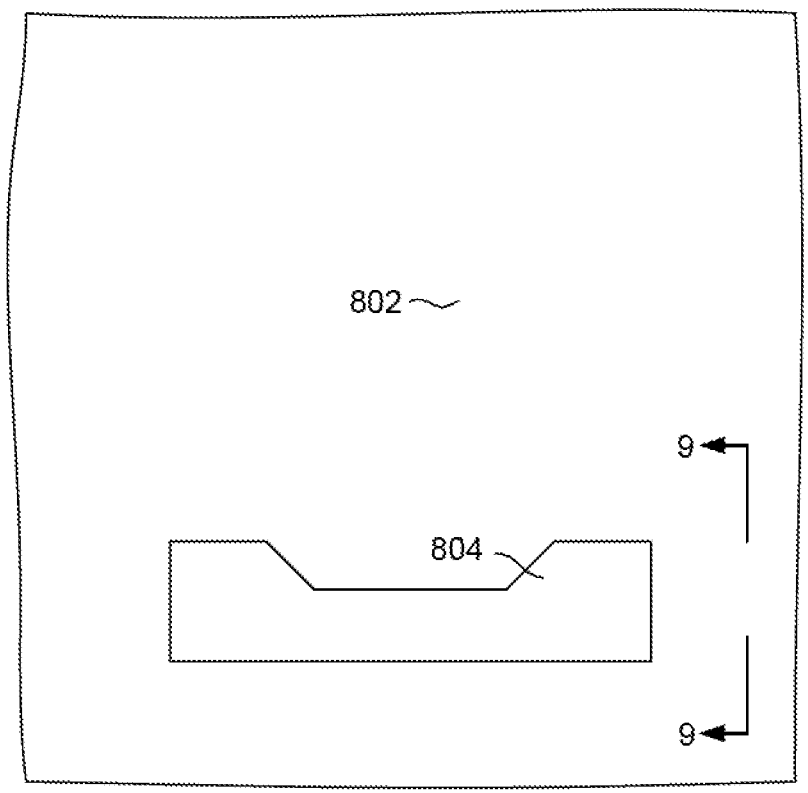
FIGS. 8-22 are views of a magnetic write head in various intermediate stages of manufacture, illustrating a method for manufacturing a magnetic write head according to an embodiment of the invention.
Figure 9:
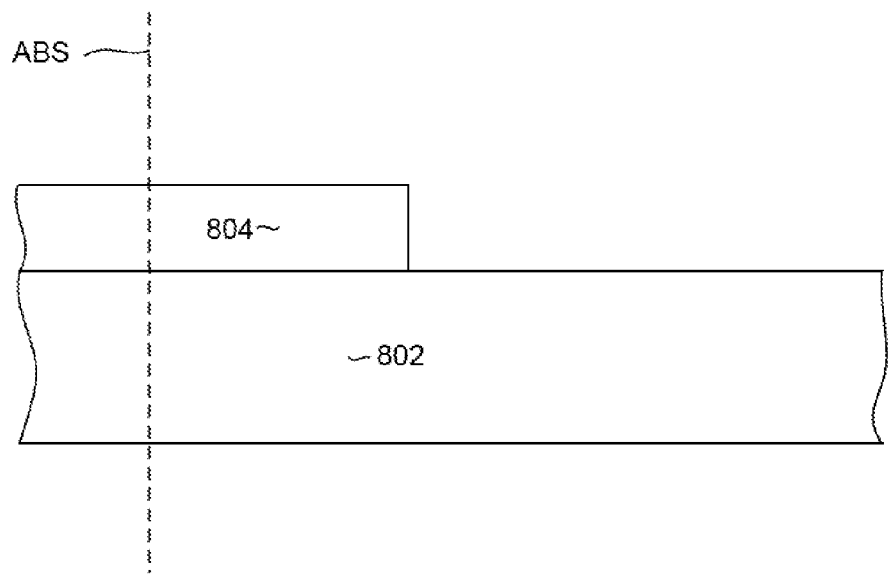

FIGS. 8-22 illustrate a method for manufacturing a magnetic write head according to an embodiment of the invention. With particular reference to FIGS. 8 and 9, a substrate 802 is provided and bottom magnetic shield layer 804 is formed over the substrate 802. FIG. 8 is a top down view and FIG. 9 is a side view as seen from line 9-9 of FIG. 8. The bottom shield 902 can be formed by electroplating a magnetic material such as NiFe or CoFe. In FIG. 9, the location of the air bearing surface plane is designated by dashed line (ABS).

Figure 10:
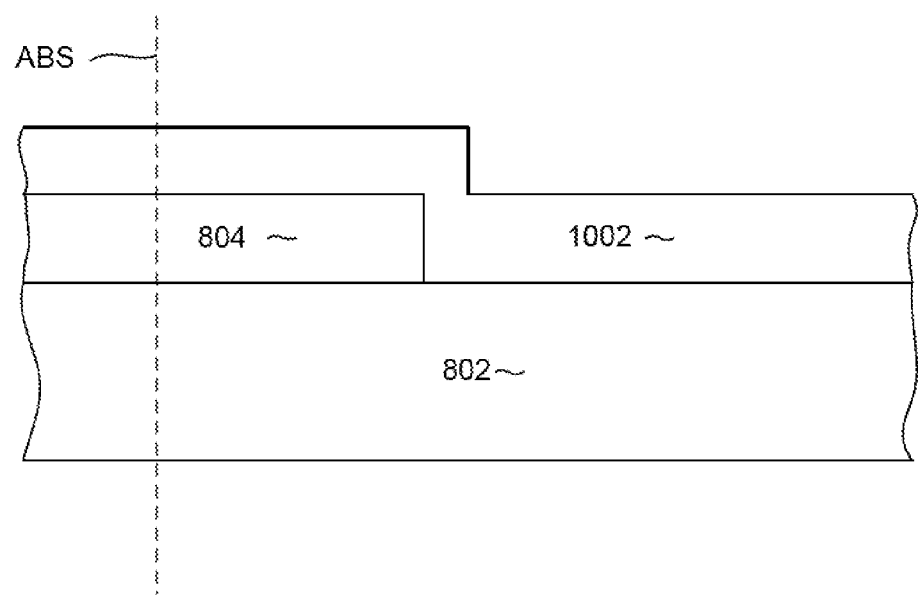
Figure 11:
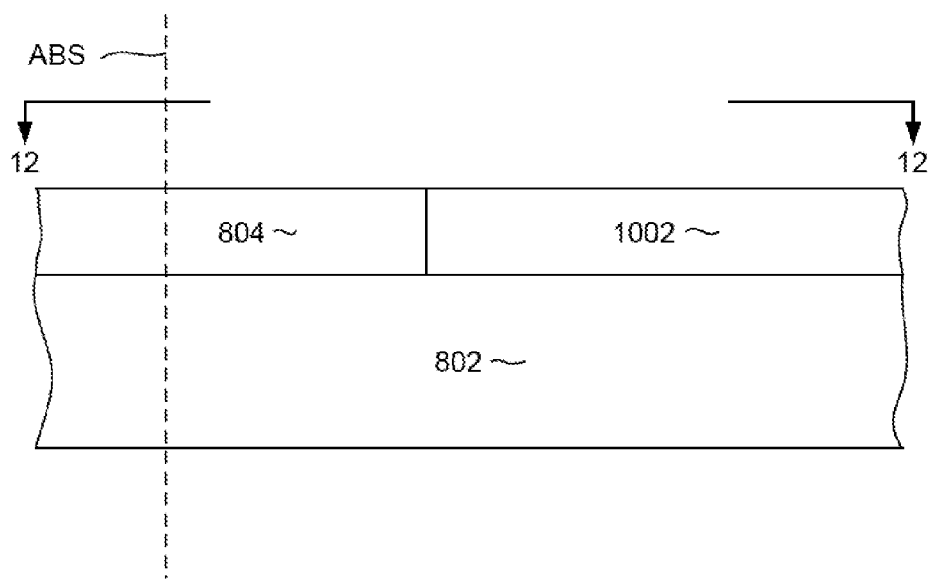
Figure 12:
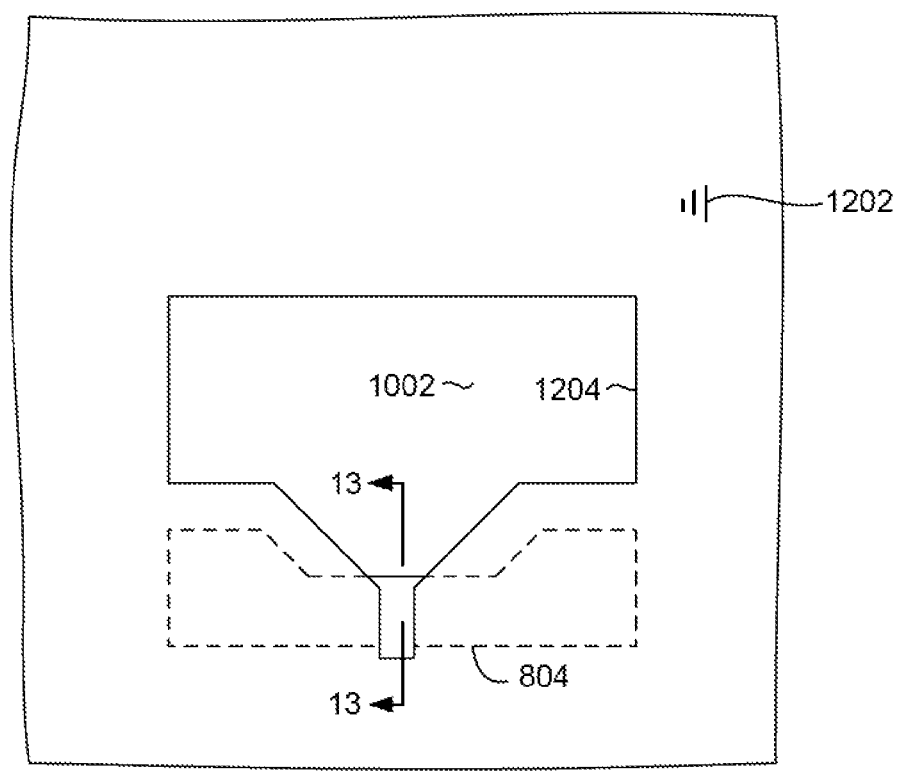

Then, with reference to FIG. 10, a non-magnetic, electrically insulating fill material such as alumina 1002 is deposited. This layer 1002 can be deposited by a bias sputtering or by atomic layer deposition (ALD). This layer 1002 is preferably deposited to a thickness that is at least equivalent to that of the magnetic shield 804. A chemical mechanical polishing process can then be performed for planarization, leaving a structure as shown in FIG. 11.

A mask 1202 is then formed, which includes a hard mask. The mask formation can involve the formation of a metal film of NiCr or similar by sputtering, followed by the formation of a resist pattern formed by photolithography, the resist being patterned with an opening that defines a write pole shape. The pattern of the resist mask is transferred to the metal film by ion milling employing an Ar beam. While the metal film was described above as being NiCr other materials could be used such as Ni, Cr or Ta as well as multi-layer films produced by lamination of a plurality of these materials. The configuration of the mask 1202 can be seen in FIG. 12, which shows a top-down view as seen from line 12-12 of FIG. 11. The mask 1202 has an opening 1204 that is configured to define a write pole. Portions of the shield 804 that are hidden beneath the mask are shown in dashed line in FIG. 12.

Figure 13:
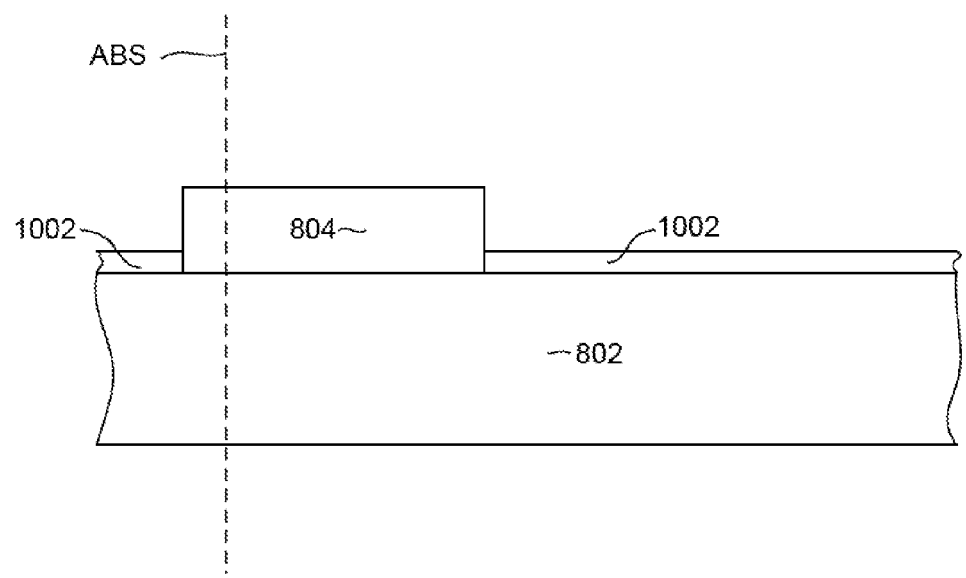

A reactive ion etching is then performed in a chemistry such as $BCl_3$ or $Cl_2$ that is chosen to preferentially remove alumina in order to remove all or a portion of the fill layer 1002 that is exposed through the opening 1204 in the mask 1202. This leaves a structure as shown in FIG. 13, which shows a cross sectional view as taken along line 13-13 of FIG. 12. As can be seen in FIG. 13, the magnetic shield material 804 extends significantly above the remaining fill material 1002.

Figure 14:
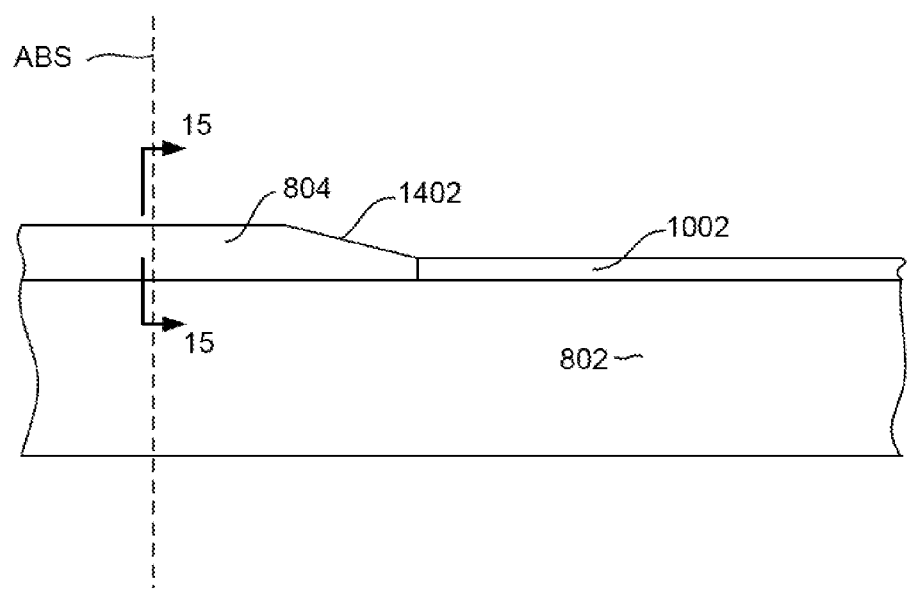

Then, another reactive ion etching (RIE) is performed to remove a portion of the shield material 804, leaving a structure as shown in FIG. 14. This RIE can be performed in a different chemistry and different conditions than the first RIE and forms a tapered surface 1402 at the back edge of the shield layer 804. Preferably, the back edge meets the remaining fill material 1002 (or substrate 802 if no fill material 1002 remains). The RIE conditions are adjusted in such a way that the etched grooves are formed in either an inverted triangular shape or an inverted trapezoidal shape. The angle at which the etching groove side walls form a normal vector with respect to the substrate surface (that is to say, the bevel angle) is typically about 10 degrees to 20 degrees. At this stage, methanol may be sued at the etching gas. While the method for etching of the alumina and shield magnetic bodies is performed in two states in this embodiment, etching of the alumina and the shields may be performed together. In addition, the dry etching method is not limited to RIE. Ion milling may also be employed.

Figure 15:
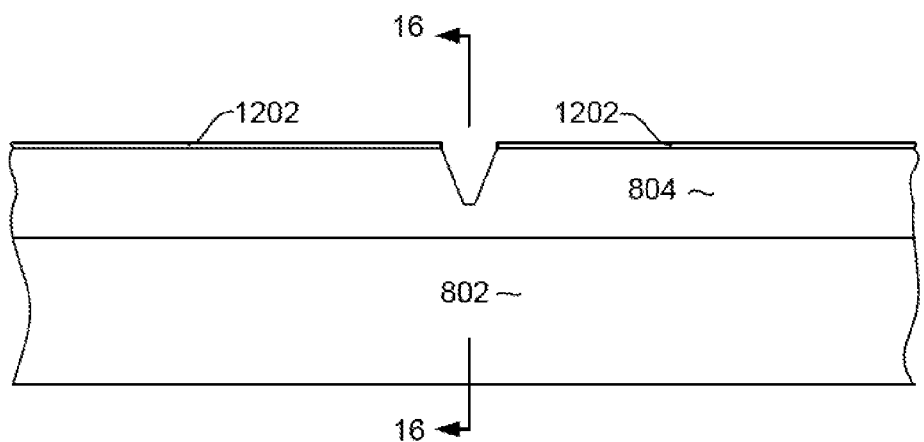

FIG. 15 shows a cross sectional view as seen from line 15-15 of FIG. 14 and shows a plane parallel with the ABS and located near the ABS. As can be seen, the ion milling is performed so that it forms a "V" shaped notch in the shield material 804. The ion milling is performed at one or more angles that are chosen to provide this "V" shaped walls that define a desired angle relative to normal that will define the angle of the side shield side walls, as will be seen.

Figure 16:
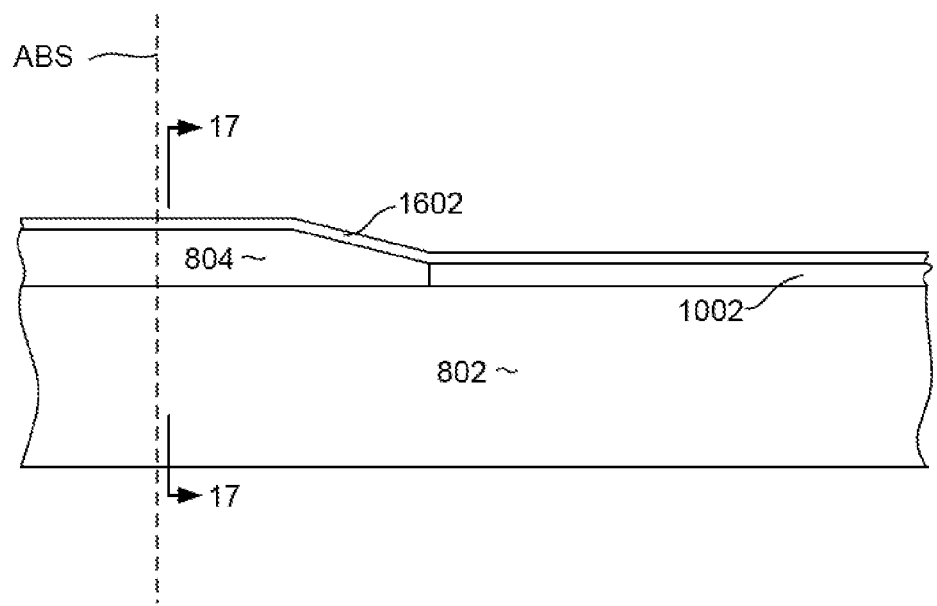
Figure 17:
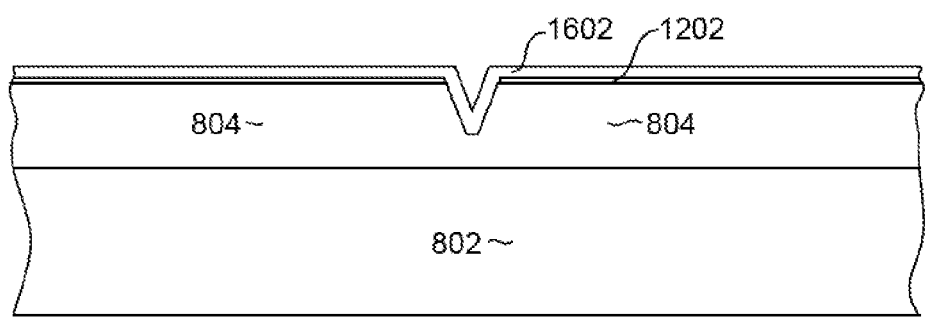

With reference now to FIGS. 16 and 17, a layer of non-magnetic side gap material 1602 is deposited. This material can be a material such as alumina, Ru, NiCu, Ta, W, NiB or NiP, and is deposited by a conformal deposition method such as atomic layer deposition. Atomic layer deposition is preferred because of its good throwing power and good film thickness controllability. The gap layer 1602 is preferably deposited to a thickness of 50 nm to 150 nm. FIG. 16 is a side cross sectional view taken along line 16-16 of FIG. 15, and FIG. 17 is a view along a plane parallel with the ABS (similar to FIG. 15) taken along line 17-17 of FIG. 16.

Figure 18:
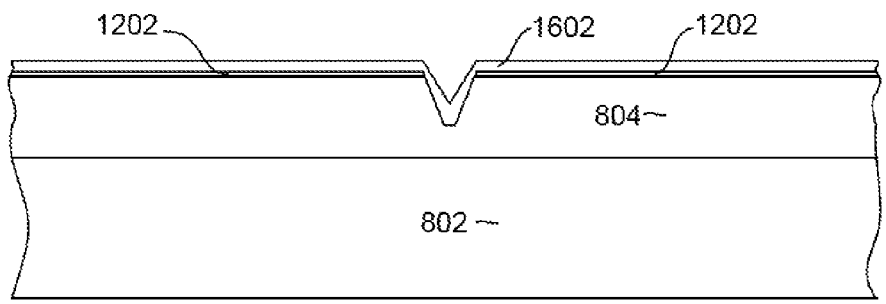

With reference now to FIG. 18, another ion milling is performed to trim the non-magnetic gap layer 1602. This ion milling is performed at one more angles relative to normal so that it causes the sides 1802 of the gap layer 1202 to form a wider "V" than that of the trench formed in the shield. This can be achieved because shadowing from the trench causes material at the top of the trench to be removed at a somewhat faster rate than material within the trench. The structure of the present invention is achieved by the adjustment of the bevel angle of the gap material 330 by ion milling. When a groove is formed by ion milling, the deeper the groove, the more unlikely it is that an Ar+ beam will reach the base or bottom portion of the groove. As a result, the etching rate in the vicinity of the opening of the groove is faster than at the bottom of the groove. Not only is etching less likely to be performed in the section where the etching rate is lower (i.e. the bottom of the groove) but there is also the possibility of film formation and reattachment. By utilizing these etching characteristics, a condition in which, as shown in FIG. 18 the side etching is greater at the opening of the groove and little or no etching occurs at the bottom of the groove. As a result, the gap width (side gap) in the vicinity of the top or opening of the groove is smaller than the gap at the bottom of the groove. Describing this condition from a geometrical perspective, the relationship whereby the side gap is less than the leading gap can be achieved by implementing a step in which the bevel angle (shield bevel) of the interface between the shield and gap kept constant while the bevel angle (main magnetic pole bevel) of the interface between the gap and the main magnetic pole (produced in a subsequent step) is increased.

Figure 19:
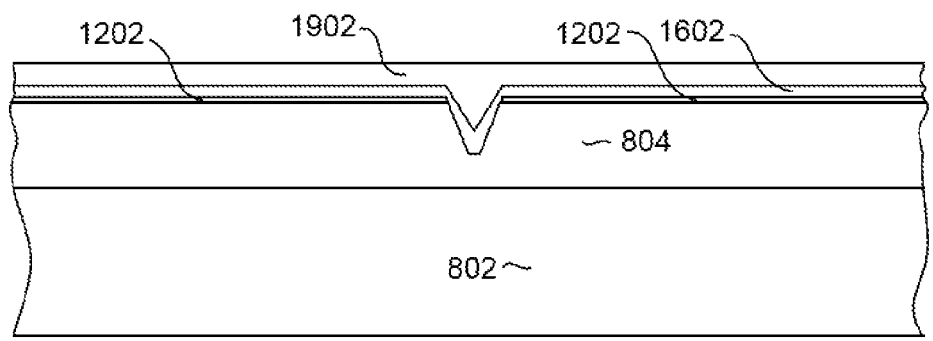
Figure 20:
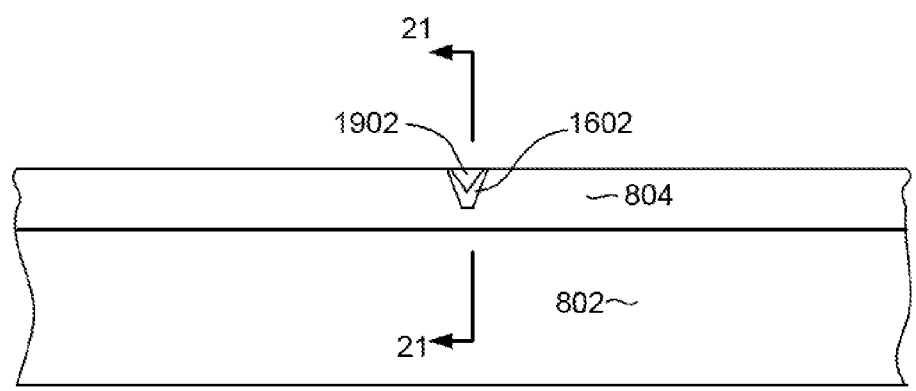
Figure 21:
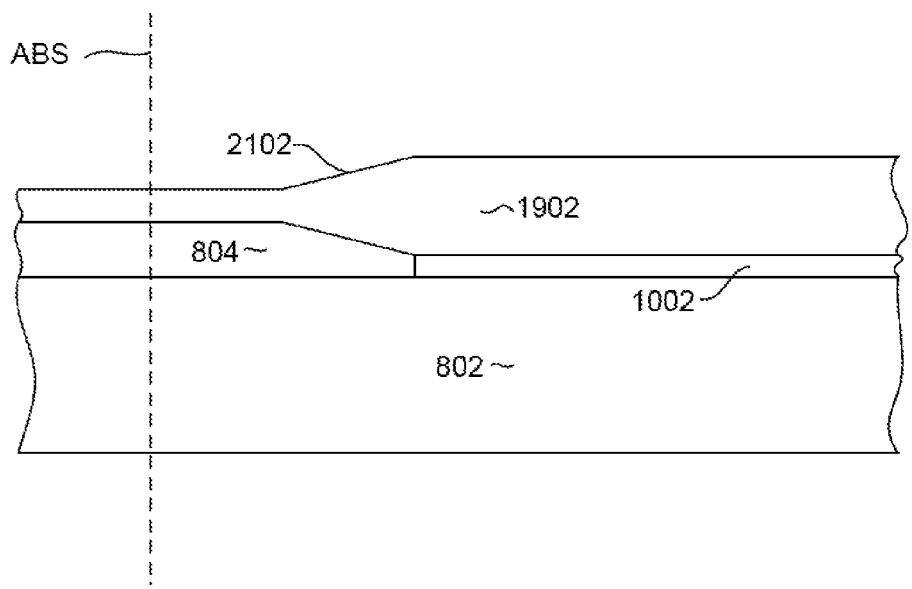

Then, with reference to FIG. 19, a magnetic write pole material 1902 is formed over the non-magnetic gap material is formed by a process such as deposition (e.g. sputter, ion beam deposition, etc) or electroplating. The magnetic write pole material 1902 can be formed as a mono-layer of CoNiFe. A chemical mechanical polishing process can be performed to planarize the structure. Then, another ion milling is performed to trim the write pole 1902. This ion milling removes portions of the gap layer 1602 that extend outside of the trench and also removes the hard mask layer 1202. This ion milling also removes a portion of the write pole material, thereby shrinking the size of the write pole 1902 in the pole tip region and also forming a leading edge taper 2102 that can be seen with reference to FIG. 21 which shows a side cross sectional view as seen from line 21-21 of FIG. 20.

Figure 22:
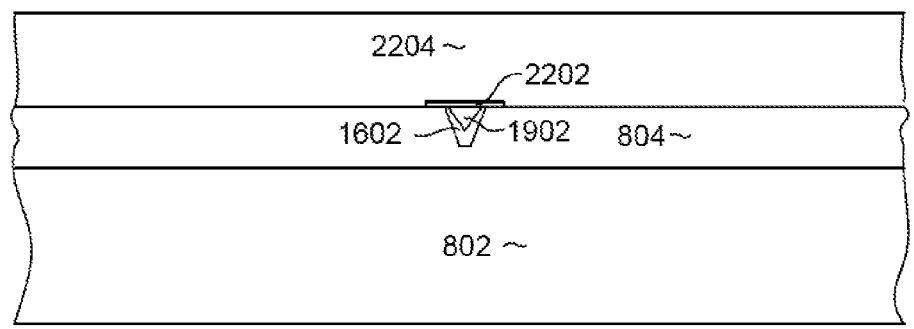

Finally, as shown in FIG. 22, with the write pole 1902 formed as described above, a non-magnetic trailing gap layer 2202 can be formed over the write pole 1902, and a trailing magnetic shield 2204 can be formed by electroplating a magnetic material such as NiFe over the write pole 1902, trailing gap layer 2202 and shield 804.

Figure 23:
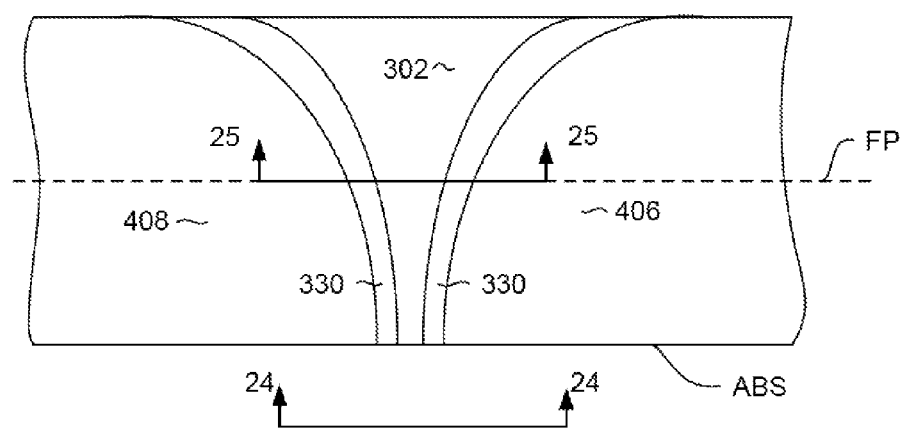
FIG. 23 is an enlarged top down view of a write pole of the magnetic head according to an alternate embodiment of the invention.

FIGS. 23-26 illustrate an alternate embodiment of the invention. FIG. 23 shows a top down view, similar to that of FIG. 4, showing a top down view of the write pole 302 in the flare region of the write pole 302. In contrast to the structure shown in FIG. 4, it can be seen in FIG. 23 that the side gaps 330 have a thickness that increases with increasing distance from the air bearing surface ABS.

Figure 24:
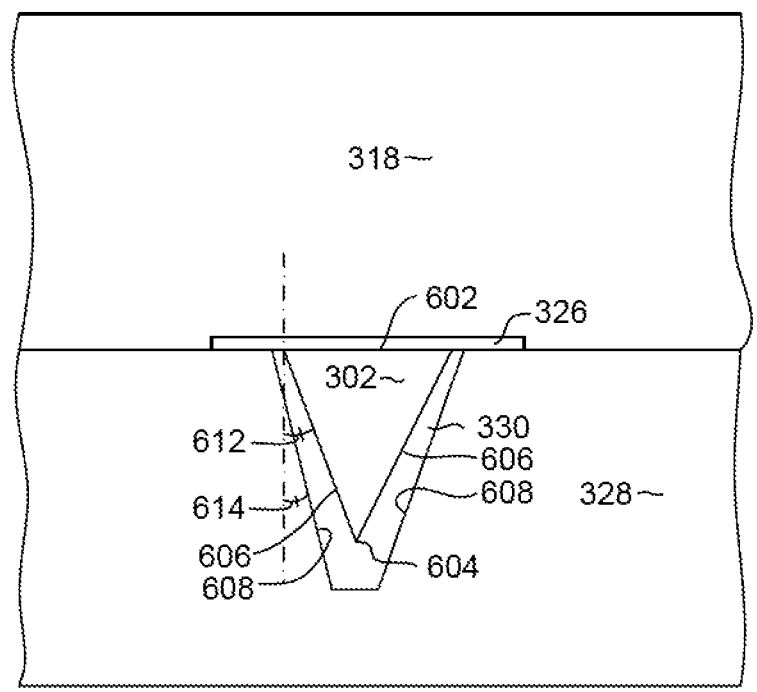
FIG. 24 is an Air Bearing Surface (ABS) view of the magnetic write head according to the alternate embodiment of the invention.
Figure 25:
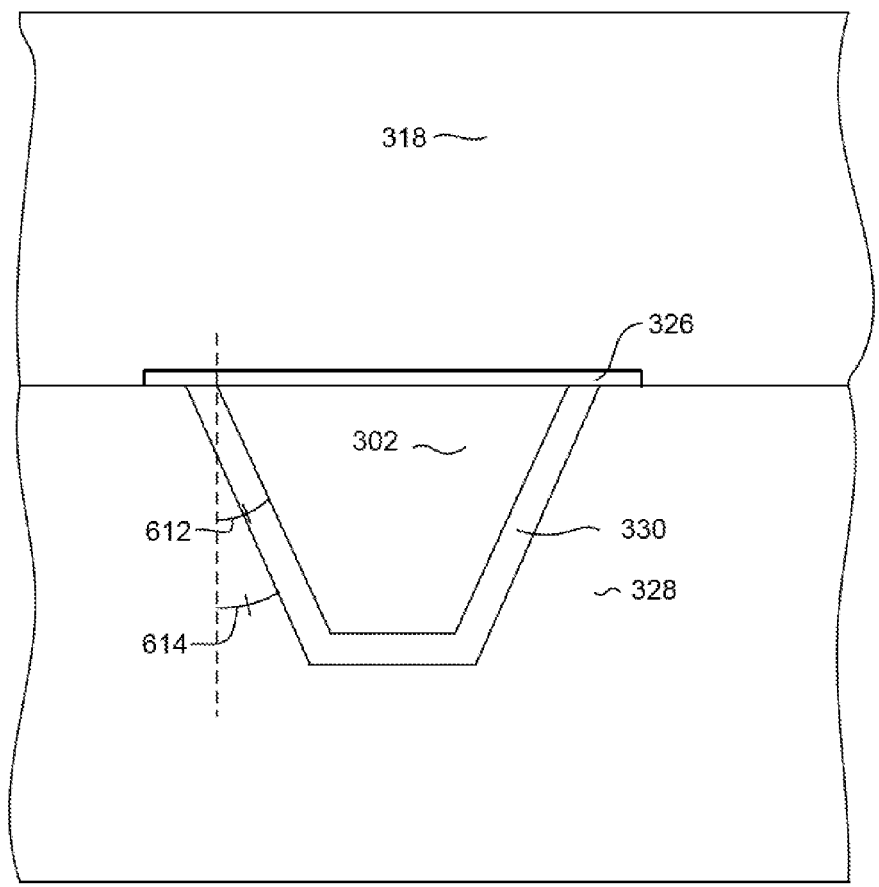
FIG. 25 is a cross sectional view of the write head according to the alternate embodiment of the invention, showing a plane parallel with the air bearing surface and located at the flare point of the write pole.

FIGS. 24 and 25 shows views of planes parallel with the ABS as seen from lines 24-24 and 25-25 of FIG. 23 respectively. In FIG. 24, it can be seen that the side gap 330 tapers as previously described so that the sides of the write pole define an angle 612 that is greater than the angle 614 defined by the edge of the side shield 328. FIG. 25, however, shows a cross sectional view at the flare point of the FP (FIG. 23) of the write pole 302. It can be seen that, at the flare point, the gap layer 330 has a more uniform thickness so that there is little or no difference between the angles 612, 614.

Figure 26:
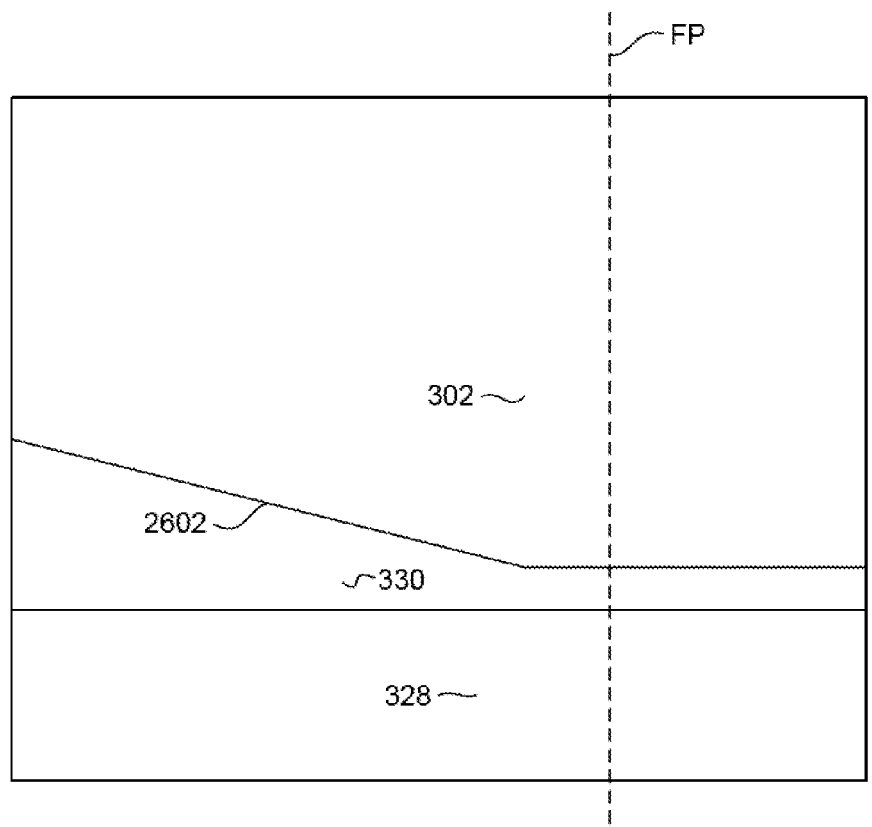
FIG. 26 is a side cross sectional view of the write head according to the alternate embodiment of the invention.

In addition, FIG. 26 shows a side cross sectional view of the write pole 302. As seen in FIG. 26, the write pole 302 has a leading edge 2602 that extends from the ABS to a point just short of the flare point FP. From this point on the tailing edge is non-tapered, being substantially perpendicular to the ABS.

Figure 33:
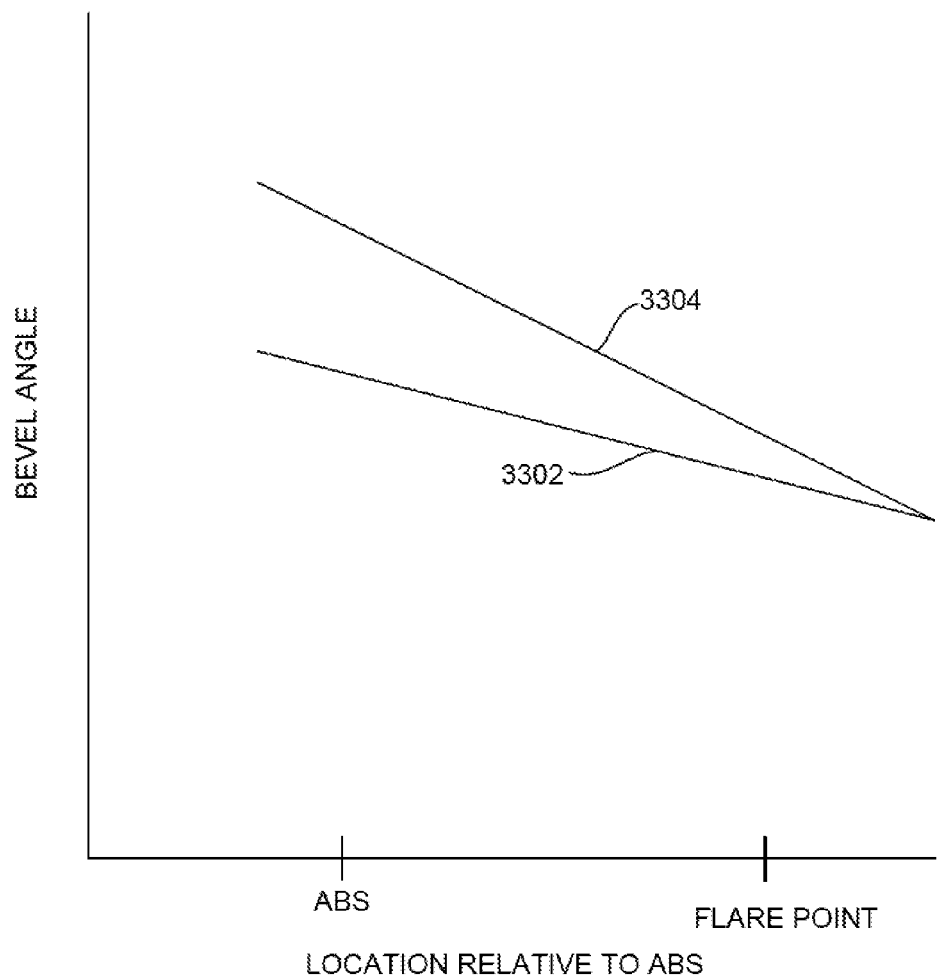
FIG. 33 is a graph showing the relationship between bevel angle of the shield and write pole and the location relative to the ABS for the embodiment described above with reference to FIGS. 24 through 26.
Figure 34:
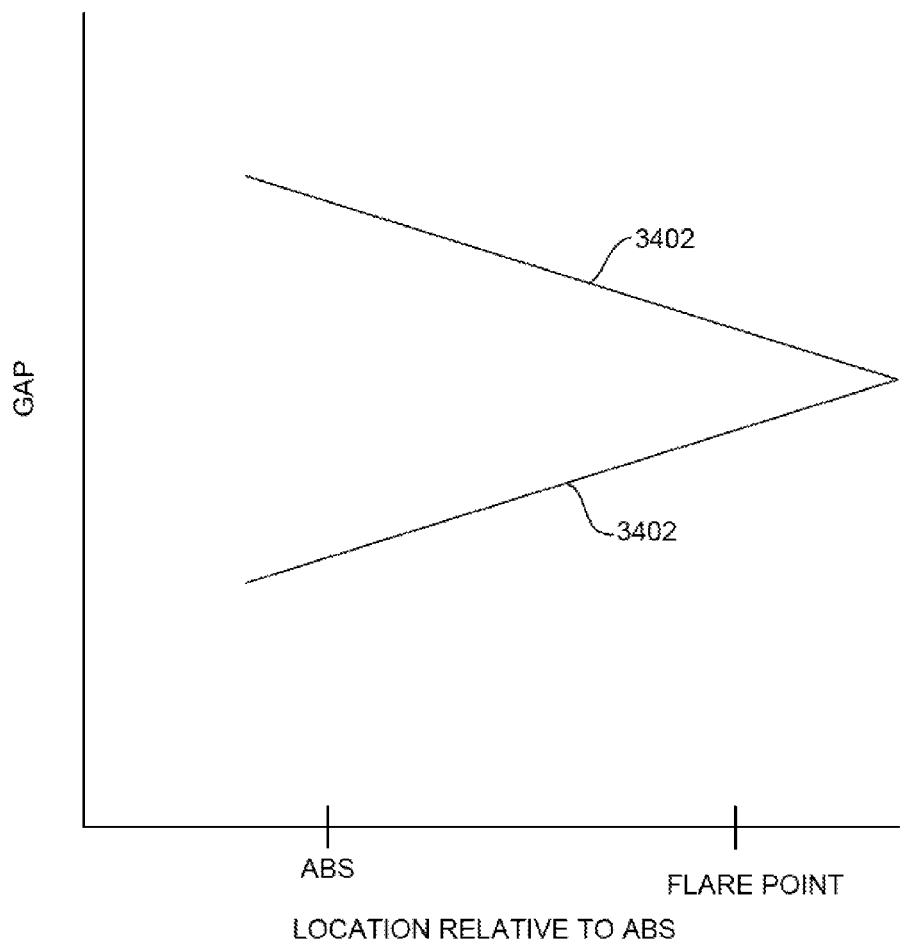
FIG. 34 is a graph showing the relationship between side and leading gap relative to location relative to the ABS for a write head according to the embodiment described above with reference to FIGS. 24-26.
Figure 35:
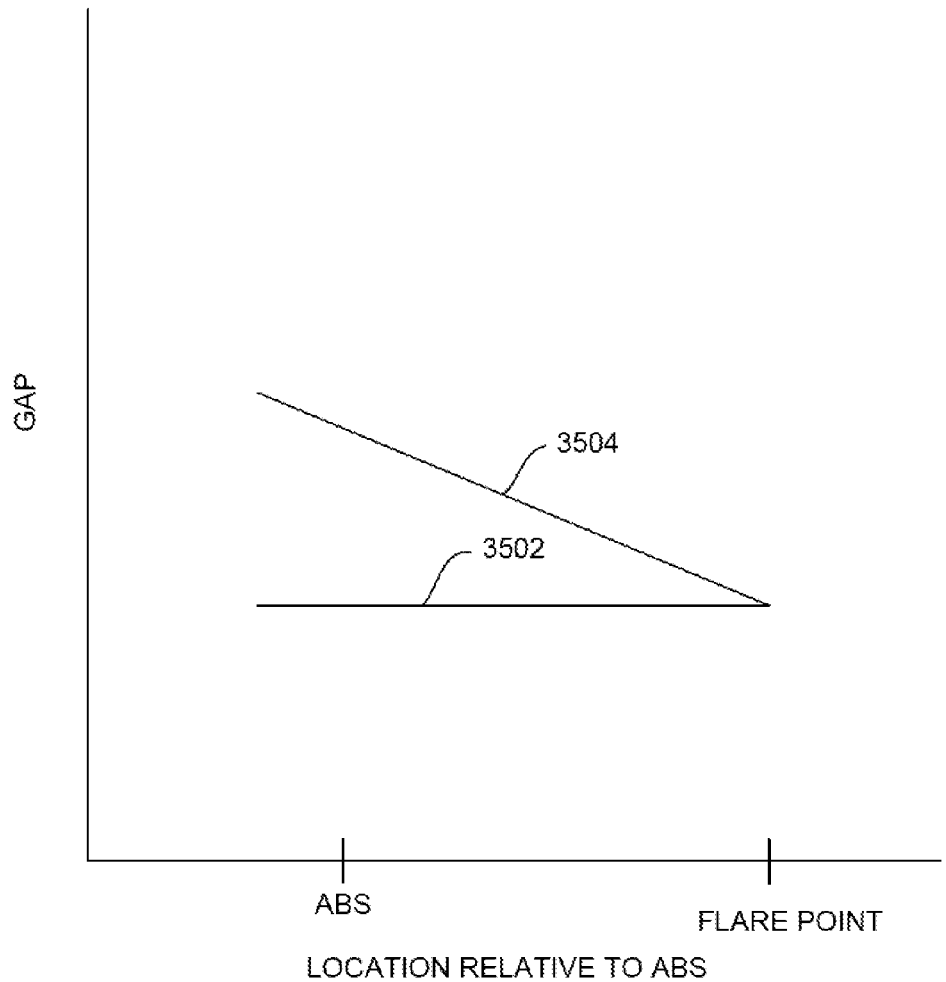
FIG. 35 is a graph showing the relationship between side and leading gap relative to location relative to the ABS for a write head according to the embodiment described above with reference to FIGS. 27-30.

FIGS. 33 and 34 show graphically how the bevel angles and gaps vary with location relative to the ABS for the embodiment described with reference to FIGS. 23-26. Fig. In FIG. 33, line 3302 shows how the leading shield bevel angle varies with location relative to the ABS, and line 3304 shows how the main pole bevel angle varies with location relative to the ABS. As can be seen, both the shield bevel angle 3302 and main pole bevel angle 3304 decrease with increasing distance from the ABS, however, the shield bevel angle decreases at a lower rate so that shield and pole both have the same bevel angle at a location at or near the flare point.

In FIG. 34, line 3402 shows how the side gap varies with location relative to the ABS and line 3402 shows how the leading gap varies with increasing distance from the ABS. It can be seen that the side gap is smaller than the leading gap, but that the side gap increases with increasing distance from the ABS and the leading gap decreases with increasing distance from the ABS so that they can actually be equal to one another at a location at or near the ABS.

Figure 27:
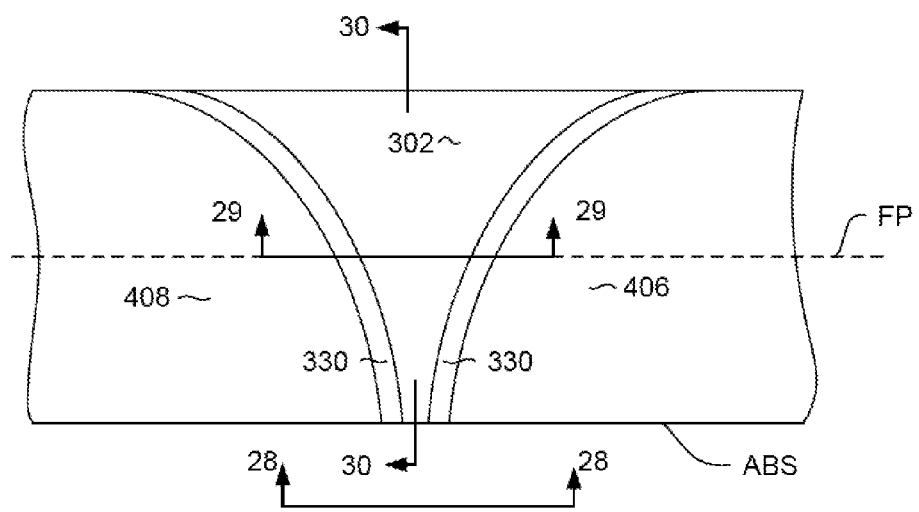
FIG. 27 is a top down view of a magnetic write head according to an another embodiment of the invention.
Figure 28:
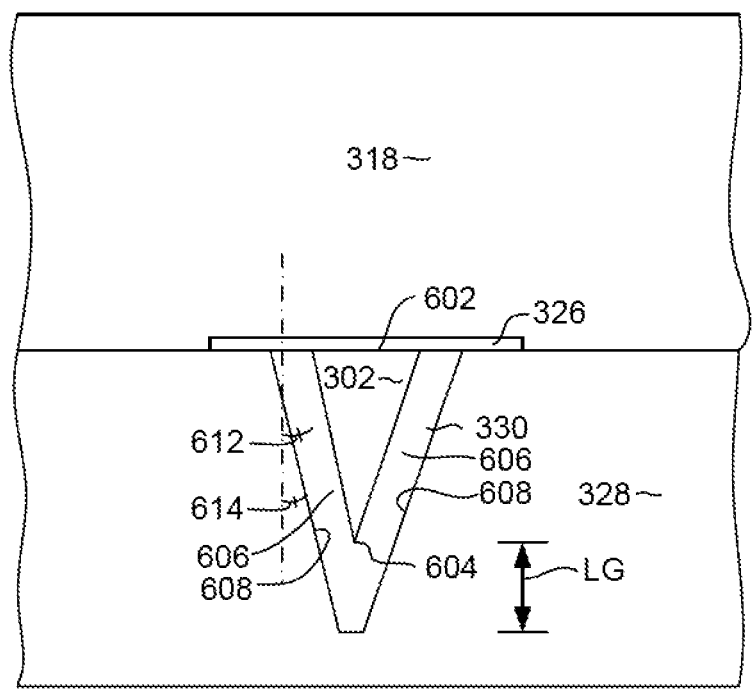
FIG. 28 is an ABS view of the write head of FIG. 27 as seen from line 28-28 of FIG. 27.
Figure 29:
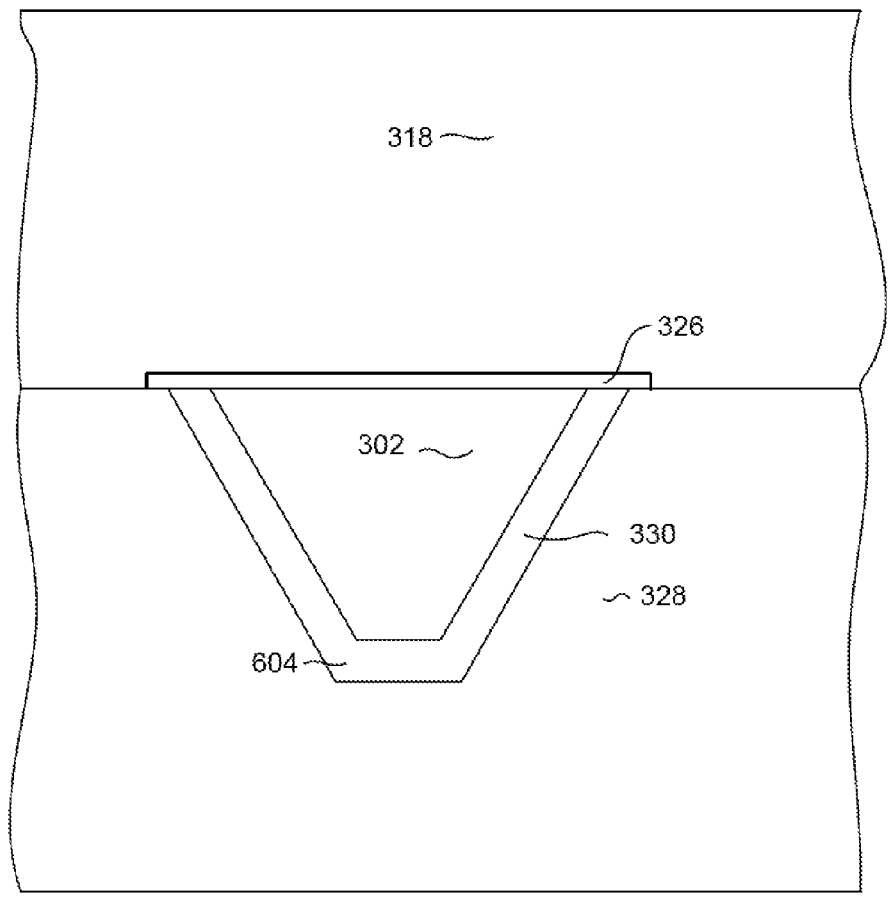
FIG. 29 is a cross sectional view of the write head of FIG. 27 as seen from line 30-30 of FIG. 27.
Figure 30:
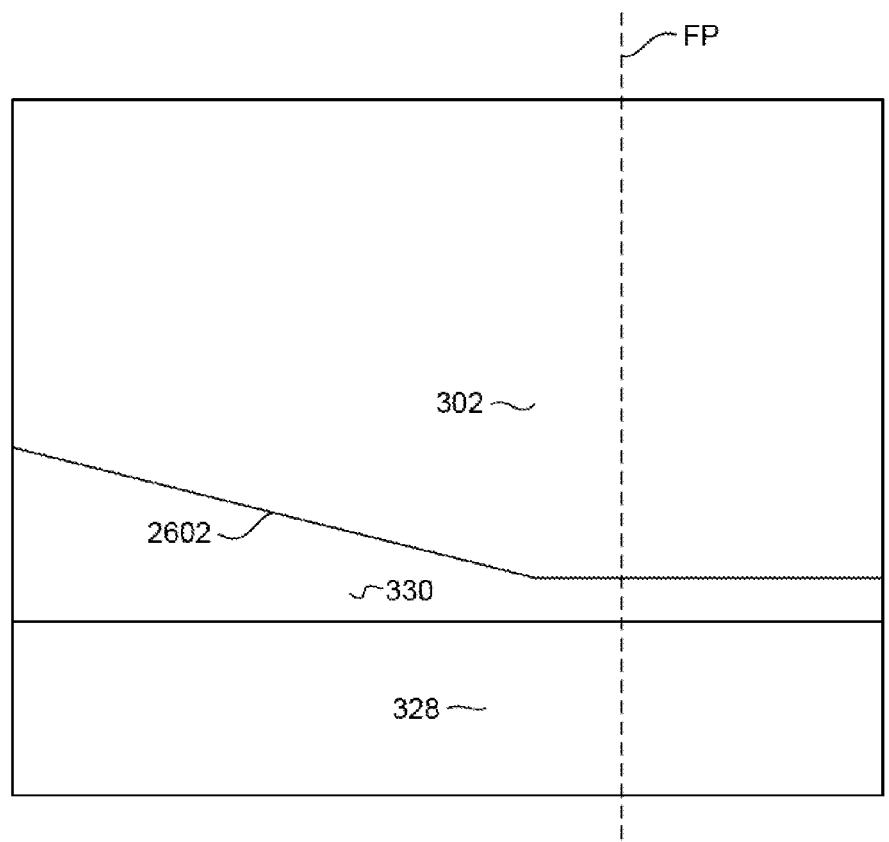
FIG. 30 is a side cross sectional view of the write head of FIG. 27 as seen from line 30-30 of FIG. 27.

FIGS. 27-30 illustrate a third embodiment of the invention. FIG. 27 shows a top down view, and as can be seen in this view the side gap is substantially constant with increasing distance from the ABS. FIG. 28 shows an ABS view as seen from line 28-28 of FIG. 27, and FIG. 29 shows a cross sectional view along line 29-29 of FIG. 27. FIG. 30 shows a side cross sectional view taken from line 30-30 of FIG. 27. FIGS. 28, 29 and 30 together show that while the side gap thickness remains constant, the leading gap decreases with increasing distance from the ABS. This can be seen graphically with reference to FIG. 33, where the line 3302 shows the side gap thickness as a function of location relative to the ABS and line 3304 shows the leading gap thickness as a function of location relative to the ABS. As can be seen, the side gap 3302 is substantially constant, whereas the leading gap 3304 decreases with increasing distance from the ABS, to the point where the side gap 3302 and leading gap 3304 can be equal at a point at or near the flare point of the write head.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for magnetic data recording, comprising:
   a magnetic write pole extending to an air bearing surface and having a trailing edge a leading edge and first and second sides each extending from the trailing edge to the leading edge, each of the first and seconds sides defining a write pole bevel angle with respect to a plane that is perpendicular to the trailing edge of the write pole;
   a non-magnetic gap layer; and
   a magnetic shield separated from the first and second sides of the write pole and from the leading edge of the write pole by the non-magnetic gap layer, the magnetic shield having inner sides that each define a shield bevel angle with respect to the plane that is perpendicular to the trailing edge of the write pole the shield bevel angle at the air bearing surface being greater than the write pole bevel angle at the air bearing surface;
   wherein the write pole has a width that gradually increases with increasing distance from the air bearing surface.

2. The magnetic write head as in claim 1 wherein the non-magnetic gap layer wraps around the leading edge of the write pole and is also formed along the first and second sides of the write pole to pro-vide both leading gap and side gap functions.

3. The magnetic write head as in claim 2 wherein the non-magnetic gap layer has a greater thickness near the leading edge of the write pole than it does near the trailing edge of the write pole.

4. The magnetic write head as in claim 1 wherein the write pole bevel angle and the side shield bevel angle are each 10-30 degrees.

5. The magnetic write head as in claim 1 wherein the difference between the write pole bevel angle at the air bearing surface and the shield bevel angle is 2-10 degrees.

6. The magnetic write head as in claim 1 wherein the magnetic shield is provides both side shielding and leading shielding functions.

7. The magnetic write head as in claim 1 further comprising:
a non-magnetic trailing gap layer; and
a trailing magnetic shield separated from the trailing edge of the write pole by the non-magnetic trailing gap layer.

8. The magnetic write head as in claim 1 wherein the non-magnetic gap layer comprises alumina, Ru, NiCr, Ta, W, NiB or NiP.

9. The magnetic write head as in claim 1 wherein the magnetic write pole comprises CoNiFe or NiFe.

10. The magnetic write head as in claim 1 wherein the non-magnetic gap layer has a thickness that increases with increasing distance from the air bearing surface.

11. The magnetic write head as in claim 1 wherein the write pole has a width that gradually increases with increasing distance from the air bearing surface.

12. The magnetic write head as in claim 1 wherein the difference between the shield bevel angle and the write pole bevel angle is less in an area removed from the air bearing surface than it is at the air bearing surface.

13. A method for manufacturing a magnetic write head, comprising:
forming a magnetic shield structure, the magnetic shield structure having a surface;
forming a trench in the magnetic shield structure, the trench having sides that define shield bevel angle measured relative to a normal to the surface of the shield structure;
depositing a non-magnetic material into the trench;
performing an ion milling to remove a portion of the non-magnetic material to cause an inner surface of the non-magnetic material to define a write pole bevel angle measured relative to the normal to the surface the shield that is greater than the shield bevel angle; and
forming a magnetic material over the non-magnetic material;
wherein the formation of the shield structure further comprises:
forming a magnetic shield over a substrate;
depositing a non-magnetic fill layer;
performing a chemical mechanical polishing;
performing a reactive ion etching to remove at least a portion of the non-magnetic fill layer; and
performing an ion milling to form the magnetic shield structure with a tapered upper surface.

14. The magnetic write head as in claim 13, wherein the magnetic write pole material is deposited into the trench over the non-magnetic material conforms with the non-magnetic material so that as to form a magnetic write pole having first and second sides formed at the bevel angle defined by the inner surface of the non-magnetic material.

15. The magnetic write head as in claim 13 wherein the trench has an opening and a bottom and wherein the ion milling is performed in such a manner that a greater amount of non-magnetic material is removed near the opening, than at the bottom.

16. The method as in claim 13 further comprising, after depositing the magnetic material, performing a chemical mechanical polishing, and then performing an ion milling to form a tapered upper surface on the write pole.

17. The method as in claim 13 wherein the nonmagnetic material is deposited by a conformal deposition process.

18. The method as in claim 13 wherein the non-magnetic material is deposited by atomic layer deposition.

19. The method as in claim 13 wherein the non-magnetic material comprises alumina, Ru, NiCr, Ta, W, NiB or NiP and is deposited by atomic layer deposition.

* * * * *

UNITED STATES PATENT AND TRADEMARK OFFICE
CERTIFICATE OF CORRECTION

PATENT NO. : 8,570,686 B2  
APPLICATION NO. : 13/419283  
DATED : October 29, 2013  
INVENTOR(S) : Hosomi et al.

Page 1 of 1

It is certified that error appears in the above-identified patent and that said Letters Patent is hereby corrected as shown below:

In the Claims:

col. 10, line 59 claim 2 replace "pro-vide" with --provide--;

col. 12, line 31 claim 17 replace "nonmagnetic" with --non-magnetic--.

Signed and Sealed this
Twenty-ninth Day of April, 2014

Michelle K. Lee
*Deputy Director of the United States Patent and Trademark Office*